United States Patent [19]

Ekuan

[11] 4,365,713
[45] Dec. 28, 1982

[54] CASSETTE TAPE CASE MAGAZINE
[75] Inventor: Kenji Ekuan, Tokyo, Japan
[73] Assignee: Alfa & Associates, Inc., Tokyo, Japan
[21] Appl. No.: 325,017
[22] Filed: Nov. 25, 1981
[30] Foreign Application Priority Data
  Jun. 18, 1981 [JP] Japan ............................. 56-88777[U]
[51] Int. Cl.³ ......................................... B65D 85/672
[52] U.S. Cl. ..................................... 206/387; 312/20
[58] Field of Search .............. 206/387, 455, 456, 804,
  206/312, 493, 307, 396, 250, 266, 1.5; 220/8,
  346, 347, 343, 342, 337, 306, 339; 312/20, 319,
  111, 12; 242/71.1

[56] References Cited
U.S. PATENT DOCUMENTS

| | | | |
|---|---|---|---|
| 3,642,337 | 2/1972 | Manheim | 206/387 |
| 3,912,077 | 10/1975 | Krynicki | 220/347 |
| 4,026,615 | 5/1977 | Tazaki et al. | 312/20 |
| 4,055,372 | 10/1977 | Tozawa et al. | 206/387 |
| 4,140,219 | 2/1979 | Somers | 206/387 |

Primary Examiner—Steven M. Pollard
Assistant Examiner—David Fidei
Attorney, Agent, or Firm—Edward A. Sokolski

[57] ABSTRACT

A cassette tape case magazine device for housing a cassette tape case. The magazine is constructed to permit easy installation therein and removal therefrom of the tape case with a simple one-hand operation. The magazine is open at one end thereof to permit the entrance therein of the tape case. Notches are formed in the top and bottom walls at the opposite ends of this opening to permit the user's fingers to insert and remove the tape case. A flexible U-shaped retainer is mounted on a side wall of the magazine and has a pair of projections which fit into the drive shaft holes of the cassette in retaining engagement therewith. A detent is formed in either the top or bottom wall of the magazine, this detent fitting into one of the recording claw holes of the cassette in retaining engagement therewith. A magazine case is also provided to store the magazines, this magazine case having T-shaped hooks which matingly engage hook holes formed in the end wall of the magazine to retain the magazines in the magazine case.

7 Claims, 7 Drawing Figures

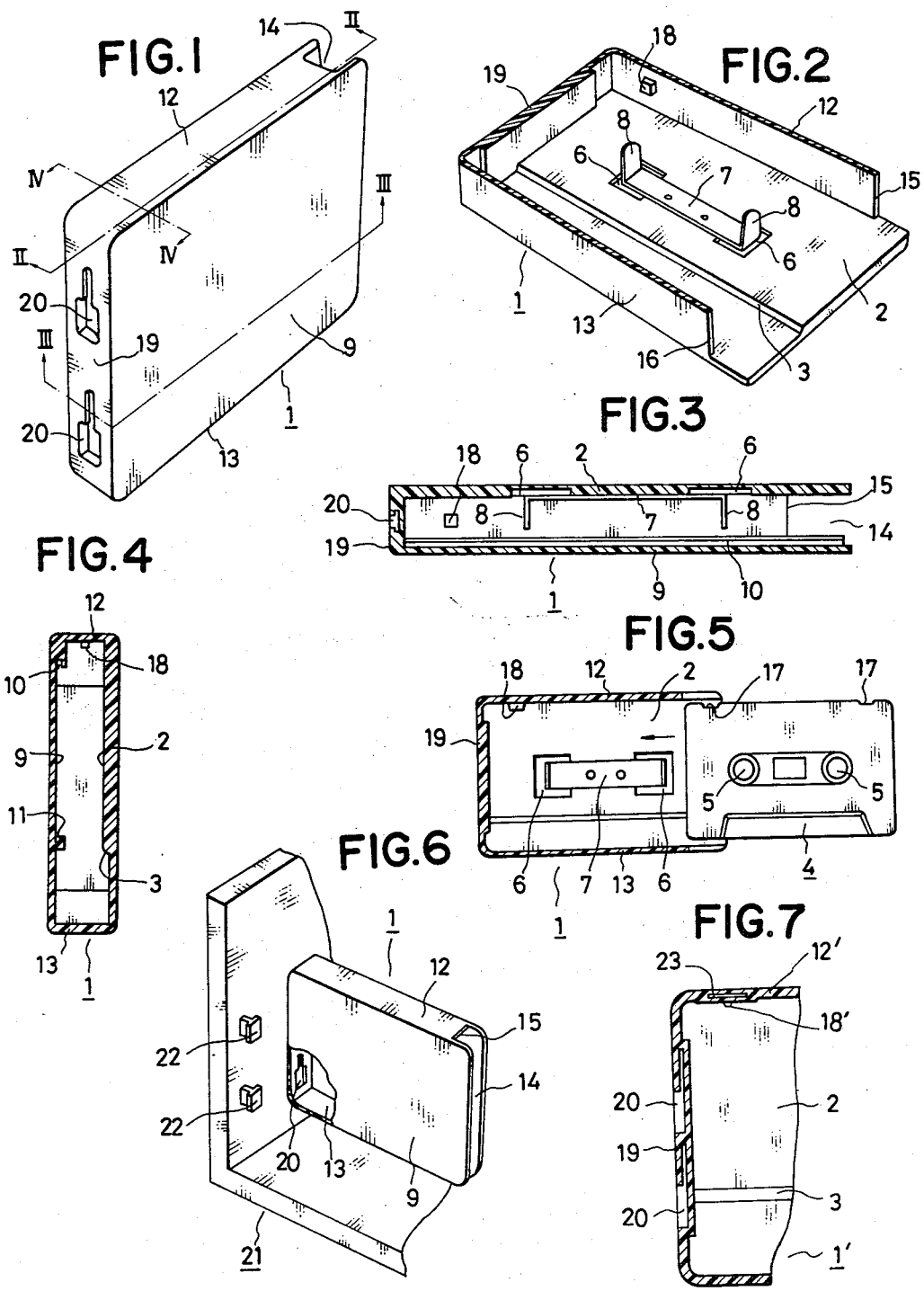

CASSETTE TAPE CASE MAGAZINE

The present invention relates to a magazine for a cassette-type tape case for holding magnetic tape used for recording and play-back, and more particularly to such a magazine designed and constructed to permit the easy installation therein and removal therefrom of a cassette tape case by a simple one-hand operation.

According to the present invention, there is provided a cassette tape case magazine comprising: a pair of flexible engaging projections formed on the inner surface of one side thereof; mutually opposing L-shaped title or information card holding portions formed integrally with the body of said magazine on the inner surface of the other side of said magazine body; a pair of recessed hook holes formed in one outer surface of said magazine adapted for engagement with engaging projections formed on said cassette tape case; and at least one engaging projection or detent formed on the surface confronting the claw hole of said cassette tape case.

As is well known, cassette tapes for 60-minute playing or for 90-minute playing are sold in a cassette tape case magazine having a hinged cover.

In the conventional cassette tape case magazine, a pair of engaging projections are integrally formed on, for example, the cover which is hinged by suitable means to the body of the magazine. It is, therefore, essential to open and close the cover of the magazine to place the cassette tape case in and remove it from the magazine. This operation requires the use of both hands of the user, so that the conventional magazine is not well-suited for use in a car stereo, the demand for which is now increasing rapidly.

In view of the above-described problems of the prior art, the present invention aims as its major object at providing a cassette tape case magazine which is designed and constructed to permit easy installation and removal of the cassette tape case in and from the magazine by a simple one-hand operation.

To this end, according to the invention, there is provided a cassette tape case magazine having notches formed in the upper surface and bottom surface of a cassette tape case entrance, a pair of flexible engaging projections formed on the inner surface of one side of the magazine body, and at least one engaging projection or detent formed on a surface opposite two recording claws of the cassette tape case.

According to this arrangemement, a cassette tape case ordinarily used for recording and playback can be securely held at its tape driving shaft bores by a pair of flexible engaging projections formed on the inner side of one side of the magazine. At the same time, at least one of the two recording claw holes of the cassette tape case is engaged by the engaging projections formed on the surface of the magazine opposite these holes. The withdrawal of the cassette tape case can be easily achieved by grasping the same through a notched opening, so that the installation and removal of the cassette tape case in and from the magazine are considerably facilitated. Furthermore, it is possible to insert a title or information card into the other side of the cassette tape case magazine. In addition, the cassette tape case magazine of the invention can be mounted in a magazine case or the like and held by the latter by means of a pair of hook holes formed in the outer end surface.

Referring to the drawings:

FIG. 1 is a perspective view showing a preferred embodiment of the cassette tape case magazine of the invention;

FIG. 2 is a cross-sectional view taken along the plane indicated by II—II in FIG. 1;

FIG. 3 is a cross-sectional view taken along the plane indicated by III—III in FIG. 1;

FIG. 4 is a cross-sectional view taken along the plane indicated by IV—IV in FIG. 1;

FIG. 5 ia an elevational drawing partially in cross section illustrating the insertion of the cassette tape case in its magazine;

FIG. 6 is a perspective view illustrating the mounting of the magazine in a magazine case; and FIG. 7 is an enlarged partial sectional view of a second embodiment of the invention, showing particularly the engaging projections formed in the upper wall of the magazine.

A preferred embodiment of the invention will be described hereinunder. Throughout the drawings, the same reference numerals are used to denote the same parts or members.

In the embodiment shown in FIGS. 1 to 6, reference numeral "1" denotes a cassette tape case magazine in accordance with the present invention. A step 3 is formed on the inner surface of one side 2 of the cassette tape case magazine 1. A pair of holes, 6, 6 are formed in the portions of the cassette tape case magazine 1 corresponding to the tape drive shaft holes 5,5 of cassette tape case 4 with the tape case installed in the cassette tape case magazine. A pair of projections 8,8 of a flexible substantially U-shaped retainer 7 for engaging and retaining the drive shaft holes 5,5 are formed above the pair of holes 6,6. A pair of mutually opposing slide grooves 10,11 for receiving a title or information card (not shown) are formed on the inner surface of the side 9 of the cassette tape case magazine 1 opposite to the first-mentioned side 2.

The top wall 12 and the bottom wall 13 of the cassette tape case magazine 1 define an opening 14 in the magazine and have notches 15 and 16 formed therein, respectively. At least one projection 18 acting as a detent is formed on the inner surface of the top wall 12 at portions opposing two claw holes 17,17 formed in the cassette tape case 4.

Furthermore, a pair of recessed hook holes 20,20 are formed in the outer end surface 19 opposing the opening 14. As will be seen from FIG. 6, these holes 20,20 are adapted to receive a pair of T-shaped hooks 22,22 of the magazine case 21 or the like.

The cassette tape case magazine having the above-described construction is wholly molded from plastic as an integral body, except the aforementioned U-shaped retainer 7.

For placing the cassette tape case 4, ordinarily used for recording and playback, in the cassette tape case magazine 1, as shown in FIG. 5, the cassette tape case 4 is inserted through the opening 14. In consequence, the tape drive shaft holes 5,5 of the cassette tape case 4 are engaged and retained by the pair of projections 8,8 of the flexible U-shaped retainer 7, while one of the recording claw holes 17 is engaged and retained by the detent 18. It is, therefore, possible to securely store the cassette tape case 4 in the cassette tape case magazine 1 by simply sliding the cassette tape case 4 into the latter.

For taking the cassette tape case 4 out of the cassette tape case magazine 1, the cassette tape case 4 is grasped at both sides by placing one's fingers through the notches 15,16 formed in the walls defining the opening 14, and is easily drawn out of the magazine simply by pulling.

It is possible to insert a title or information card (not shown) into the opposing slide grooves 10,11.

When the cassette tape case is not being used, the cassette tape case magazine 1 accommodating this cassette tape case is mounted in a magazine case 21, such that the recessed hook holes 20 formed in the outer end surface 19 of the cassette tape case magazine matingly engage T-shaped hooks 22 of the magazine case 21, as shown in FIG. 6. It is thus possible to store a plurality of cassette tape case magazines 1 in a magazine case 21 in firm attachment thereto. The cassette tape case 4 can be installed in and removed from the cassette tape case magazine 1 with one hand with the magazine installed in the magazine case 21. Accordingly, the cassette tape case magazine of the invention is quite suitable for transportation in outdoor use, as well as for car stereos in automobiles.

FIG. 7 shows another embodiment in which a detent 18', having a cavity 23 in the thick portion of the upper wall 12', is formed integrally with the magazine body. This embodiment offers the same advantages as those of the first embodiment.

The embodiments heretofore described are not exclusive and various changes and modifications may be imparted thereto. For instance, the pair of projections of the U-shaped retainer may instead be in the form of projections resembling tooth brush bristles, or a plurality of soft pin-like projections.

As has been described, according to the invention, there is provided a cassette tape case magazine in which a pair of flexible engaging projections are formed in the inner surface of the one side thereof, and at least one engaging detent is formed in the surface confronting two recording claw holes in the cassette tape case. It is, therefore, possible to smoothly place the cassette tape case into and remove it from the cassette tape case magazine in a one-hand operation, without necessitating the opening and closing of the cover.

In addition, it is possible to engage and retain the cassette tape case in the magazines and since the pair of flexible engaging projections of the magazine are received by the drive shaft holes of the cassette tape case, it is possible to avoid undesirable idling of the tape in the cassette tape case.

It is also advantageous that the title card can be inserted as desired into a pair of mutually opposing L-shaped card holding portions.

Furthermore, it is possible to store a plurality of cassette tape case magazines when not used in a single magazine case or the like, by making a pair of recessed hook holes in the outer surface of each cassette tape case for receiving hooks provided in the magazine case or the like. Since each cassette tape case magazine is fixed at its outer end surface by the hooks of the magazine case or the like, the cassette tape case can be inserted into and withdrawn from the cassette tape case magazine simply by slidably moving the tape case with one hand, which is feasible even while driving an automobile.

The cassette tape case magazine of the present invention further has a simple economical construction and can be fabricated integrally by means of a mold, at a much reduced cost as compared with a conventional cassette tape case magazine having a hinged cover.

I claim:

1. A cassette tape case magazine device for housing a cassette tape case having a pair of holes therein for receiving tape drive shafts and at least one recording claw hole,
a pair of substantially flat and broad opposing side walls,
a pair of narrow top and bottom walls joining said side walls together,
an end wall interconnecting said side and top and bottom walls at one end thereof,
the end of said magazine opposite to said end wall being open for permitting the entrance of said tape case into said magazine,
a flexible U-shaped retainer mounted on one of said side walls and having a pair of projections extending from the inner surface of said one side wall, said projections respectively fitting into said pair of holes in the tape case in retaining engagement therewith, and
a detent formed on the inner surface of one of said top and bottom walls, said detent fitting into the claw hole of said case in retaining engagement therewith.

2. The cassette tape case magazine of claim 1 wherein notches are formed in the portions of said top and bottom walls adjacent to the open end of said magzine to facilitate the insertion and removal of the case with one hand.

3. The cassette tape case magazine of claim 1 or 2 wherein a pair of holes are formed in said one of said side walls opposite each of the projections of said U-shaped retainer to permit limited movement of said projections away from said case.

4. The cassette tape case magazine of claim 1 and further including magazine case means for removably retaining a plurality of said magazines in firm attachment thereto.

5. The cassette tape case magazine of claim 4 wherein the end wall of the magazine has at least one hook hole formed therein, said magazine case means including hook means thereon for engaging the hook hole formed in the end wall of said magazine.

6. The cassette tape case magazine of claim 5 wherein said hook means comprises at least one T-shaped hook, the hook hole having a shape for mating engagement with said hook.

7. The cassette tape case magazine of claim 6 wherein said hook means comprises a pair of said T-shaped hooks spaced apart from each other, there being a hook hole formed in the end wall of the magazine for mating engagement with each of said hooks.

* * * * *